US010777865B2

(12) United States Patent
Bae et al.

(10) Patent No.: US 10,777,865 B2
(45) Date of Patent: Sep. 15, 2020

(54) CHIP-TO-CHIP INTERFACE COMPRISING A WAVEGUIDE WITH A DIELECTRIC PART AND A CONDUCTIVE PART, WHERE THE DIELECTRIC PART TRANSMITS SIGNALS IN A FIRST FREQUENCY BAND AND THE CONDUCTIVE PART TRANSMITS SIGNALS IN A SECOND FREQUENCY BAND

(71) Applicant: KOREA ADVANCED INSTITUTE OF SCIENCE AND TECHNOLOGY, Daejeon (KR)

(72) Inventors: Hyeon Min Bae, Daejeon (KR); Ha Il Song, Daejeon (KR); Joon Yeong Lee, Daejeon (KR); Tae Hoon Yoon, Daejeon (KR); Hyo Sup Won, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 26 days.

(21) Appl. No.: 16/145,576

(22) Filed: Sep. 28, 2018

(65) Prior Publication Data
US 2019/0067776 A1 Feb. 28, 2019

Related U.S. Application Data

(63) Continuation of application No. PCT/KR2017/003337, filed on Mar. 28, 2017.

(30) Foreign Application Priority Data

Mar. 28, 2016 (KR) .................. 10-2016-0037121
Mar. 28, 2016 (KR) .................. 10-2016-0037141
Mar. 27, 2017 (KR) .................. 10-2017-0038739

(51) Int. Cl.
*H01P 1/213* (2006.01)
*H01P 3/16* (2006.01)
(Continued)

(52) U.S. Cl.
CPC ............. *H01P 1/2138* (2013.01); *H01P 3/081* (2013.01); *H01P 3/10* (2013.01); *H01P 3/12* (2013.01);
(Continued)

(58) Field of Classification Search
CPC .......... H01P 3/16; H01P 3/122; H01P 1/2002; H01P 1/213; H01P 1/2138
(Continued)

(56) References Cited

U.S. PATENT DOCUMENTS 3,268,902 A * 8/1966 Turrin ................. H01P 1/16
343/772
3,703,690 A 11/1972 Ravenscroft et al.
(Continued)

FOREIGN PATENT DOCUMENTS

CA 2449596 A1 6/2005
CN 1365160 A 8/2002
(Continued)

OTHER PUBLICATIONS

Soon Hee Kim, Ui Seok Hong and Jae Ho Lee, "A Study on the Propagation Charateristics of Circular Waveguide with N-Layer Dielectric" Institute of Electronic Communications Sci. & Eng, Kwangwoon Univeristy, May 24, 1986.
(Continued)

*Primary Examiner* — Benny T Lee
(74) *Attorney, Agent, or Firm* — Dinsmore & Shohl LLP; Yongsok Choi, Esq.

(57) ABSTRACT

The present invention relates to a waveguide for transmission of electromagnetic wave signals and a chip-to-chip
(Continued)

interface apparatus comprising the same. According to one aspect of the invention, there is provided a waveguide for transmission of electromagnetic wave signals, comprising: a dielectric part; and a conductor part surrounding at least a part of the dielectric part, wherein a signal of a first frequency band is transmitted through the dielectric part, and a signal of a second frequency band lower than the first frequency band is transmitted through the conductor part.

7 Claims, 3 Drawing Sheets

(51) Int. Cl.
| | | |
|---|---|---|
| *H01P 3/10* | (2006.01) | |
| *H01P 5/08* | (2006.01) | |
| *H01P 3/12* | (2006.01) | |
| *H01P 5/02* | (2006.01) | |
| *H01P 3/08* | (2006.01) | |
| *H01Q 9/04* | (2006.01) | |
| *H01Q 13/06* | (2006.01) | |
| *H04L 12/40* | (2006.01) | |

(52) U.S. Cl.
CPC ............... *H01P 3/122* (2013.01); *H01P 3/16* (2013.01); *H01P 3/165* (2013.01); *H01P 5/02* (2013.01); *H01P 5/08* (2013.01); *H01P 5/087* (2013.01); *H01Q 9/045* (2013.01); *H01Q 9/0407* (2013.01); *H01Q 13/06* (2013.01); *H04L 12/40052* (2013.01)

(58) Field of Classification Search
USPC ......................................... 333/239, 126, 135
See application file for complete search history.

(56) References Cited

U.S. PATENT DOCUMENTS

| | | | |
|---|---|---|---|
| 4,216,449 A | | 8/1980 | Kach |
| 4,441,091 A | | 4/1984 | Nishida et al. |
| 5,109,232 A | * | 4/1992 | Monte .................. H01Q 25/04 |
| | | | 333/126 |
| 5,488,380 A | | 1/1996 | Harvey et al. |
| 6,417,742 B1 | | 7/2002 | Enokuma |
| 2002/0027481 A1 | * | 3/2002 | Fiedziuszko ............ H01P 1/203 |
| | | | 333/116 |
| 2003/0122634 A1 | | 7/2003 | Goff |
| 2003/0227360 A1 | | 12/2003 | Kirihara et al. |
| 2013/0256849 A1 | | 10/2013 | Elad et al. |
| 2014/0368301 A1 | | 12/2014 | Herbsommer et al. |
| 2015/0295297 A1 | | 10/2015 | Cook et al. |
| 2015/0295299 A1 | | 10/2015 | Herbsommer |

FOREIGN PATENT DOCUMENTS

| | | |
|---|---|---|
| CN | 102956946 A | 3/2013 |
| CN | 103091769 A | 5/2013 |
| FR | 1190178 A | 10/1959 |
| JP | S5527717 A | 2/1980 |
| JP | 2002543449 A | 12/2002 |
| JP | 2003069312 A | 3/2003 |
| JP | 2004015483 A | 1/2004 |
| JP | 2005515677 A | 5/2005 |
| JP | 2007235630 A | 9/2007 |
| JP | 2008028523 A | 2/2008 |
| JP | 4724849 B2 | 7/2011 |
| JP | 2015080100 A | 4/2015 |
| JP | 2018537044 A | 12/2018 |
| KR | 1020010112034 A | 12/2001 |
| KR | 100846872 B1 | 7/2008 |
| WO | 2017102157 A1 | 6/2017 |

OTHER PUBLICATIONS

International Search Report dated Jul. 18, 2017.
Andrey Mozharovskiy, et al., "Wideband Tapered Antipodal Fin-Line Waveguide-to-Microstrip Transition for E-band Applications," 2013 European Microwave Conference, Nuremberg, Oct. 2013, pp. 1187-1190.
Sung Jing, et al., "Waveguide-to-Microstrip Antipodal Finline Transition at W Band," 2013 Third International Conference on Instrumentation, Measurement, Computer, Communication and Control, Shenyang, Sep. 2013, pp. 510-513.
Shaghik Atakaramians, et al., "Terahertz dielectric waveguides", Advances in Optics and Photonics, 2013 Optical Society of America, Jun. 27, 2013, vol. 5, No. 2, pp. 169-215.
George E. Ponchak, et al., "A New Model for Broadband Waveguide to Microstrip Transition Design", NASA Technical Memorandum, Lewis Research Center, Cleveland Ohio, Dec. 1986.

* cited by examiner

CHIP-TO-CHIP INTERFACE COMPRISING A WAVEGUIDE WITH A DIELECTRIC PART AND A CONDUCTIVE PART, WHERE THE DIELECTRIC PART TRANSMITS SIGNALS IN A FIRST FREQUENCY BAND AND THE CONDUCTIVE PART TRANSMITS SIGNALS IN A SECOND FREQUENCY BAND

CROSS-REFERENCE TO RELATED APPLICATIONS

This application is a continuation application of PCT/KR2017/003337 filed on Mar. 28, 2017 which claims priority to Korean Patent Application No. 10-2016-0037121 filed on Mar. 28, 2016, Korean Patent Application No. 10-2016-0037141 filed on Mar. 28, 2016, and Korean Patent Application No. 10-2017-0038739 filed on Mar. 27, 2017, the entire contents of which are herein incorporated by reference.

FIELD OF THE INVENTION

The present invention relates to a waveguide for transmission of electromagnetic wave signals and a chip-to-chip interface apparatus comprising the same.

BACKGROUND

As data traffic is rapidly increased, data transmission/reception speed of I/O bus connecting integrated circuits is also being quickly increased. Over recent decades, conductor-based interconnects (e.g., copper wires) with high cost and power efficiency have been widely applied to wired communication systems. However, such conductor-based interconnects have inherent limitations in channel bandwidths due to skin effect caused by electromagnetic induction.

Meanwhile, optic-based interconnects with high data transmission/reception speed have been introduced and widely used as an alternative to the conductor-based interconnects. However, the optic-based interconnects have limitations in that they cannot completely replace the conductor-based interconnects because of the high costs of installation and maintenance thereof.

Recently, a new type of interconnect has been introduced, which comprises a dielectric part in the form of a core and a conductor part in the form of a thin cladding surrounding the dielectric part. The new type of interconnect (so-called e-tube) has advantages of both of metal and dielectric, and enables high-speed data communication within a short range. Thus, it has come into the spotlight as an interconnect employable in chip-to-chip communication.

In this regard, the inventor(s) present a technique for effectively transmitting electromagnetic wave signals of various frequency bands using a single waveguide in a chip-to-chip interface apparatus including an e-tube.

SUMMARY OF THE INVENTION

One object of the present invention is to solve all the above-described problems.

Another object of the invention is to effectively transmit electromagnetic wave signals of various frequency bands using a single waveguide, by providing a waveguide comprising a dielectric part and a conductor part surrounding at least a part of the dielectric part, wherein a signal of a first frequency band is transmitted through the dielectric part, and a signal of a second frequency band lower than the first frequency band is transmitted through the conductor part.

According to one aspect of the invention to achieve the objects as described above, there is provided a waveguide for transmission of electromagnetic wave signals, comprising: a dielectric part; and a conductor part surrounding at least a part of the dielectric part, wherein a signal of a first frequency band is transmitted through the dielectric part, and a signal of a second frequency band lower than the first frequency band is transmitted through the conductor part.

Further, according to another aspect of the invention, there is provided a chip-to-chip interface apparatus, comprising: the waveguide; and a microstrip circuit coupled to the waveguide, wherein the microstrip circuit transmits the signal of the first frequency band to be transmitted through the dielectric part and the signal of the second frequency band to be transmitted through the conductor part to the dielectric part and the conductor part, respectively.

In addition, there are further provided other waveguides to implement the invention.

According to the invention, electromagnetic wave signals of various frequency bands may be effectively transmitted using a single waveguide.

According to the invention, interference between a signal of a first frequency band transmitted through a dielectric part of a waveguide and a signal of a second frequency band transmitted through a conductor part of the waveguide may be minimized.

DETAILED DESCRIPTION OF THE INVENTION

Figure 1:
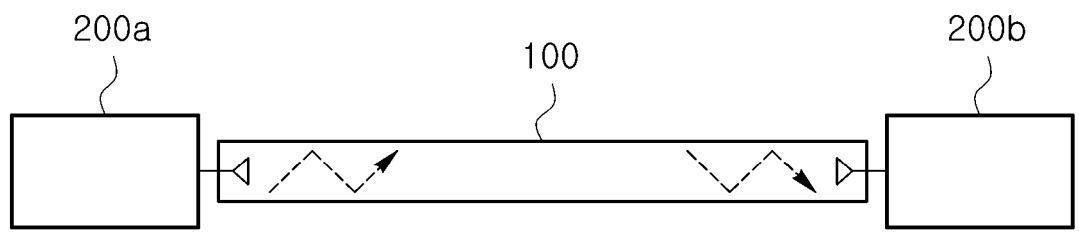
FIG. 1 conceptually shows the configuration of a chip-to-chip interface apparatus interconnected with a two-port network according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the locations or arrangements of individual elements within each of the disclosed embodiments may also be modified without departing from the spirit and scope of the invention. Therefore, the following detailed description is not to be taken in a limiting sense, and the scope of the invention, if properly described, is limited only by the appended claims together with all equivalents thereof. In the drawings, like reference numerals refer to the same or similar functions throughout the several views.

Hereinafter, preferred embodiments of the present invention will be described in detail with reference to the accompanying drawings to enable those skilled in the art to easily implement the invention.

Configuration of a Chip-to-Chip Interface Apparatus

FIG. 1 conceptually shows the configuration of a chip-to-chip interface apparatus interconnected with a two-port network according to one embodiment of the invention.

Referring to FIG. 1, a chip-to-chip interface apparatus according to one embodiment of the invention may comprise: a waveguide 100, which is an interconnect means for transmission of electromagnetic wave signals (e.g., data communication) between two chips (not shown) each present in two physically separated boards (not shown) or present in a single board (not shown); and microstrip circuits 200a, 200b, which are means for transmitting the signals from the two chips to the waveguide 100 or vice versa. It should be understood that the chips described herein do not only represent electronic circuit components in a traditional sense, each comprising a number of semiconductors such as transistors or the like, but also encompass, in their broadest sense, all types of components or elements that can exchange electromagnetic wave signals with each other.

Figure 3:
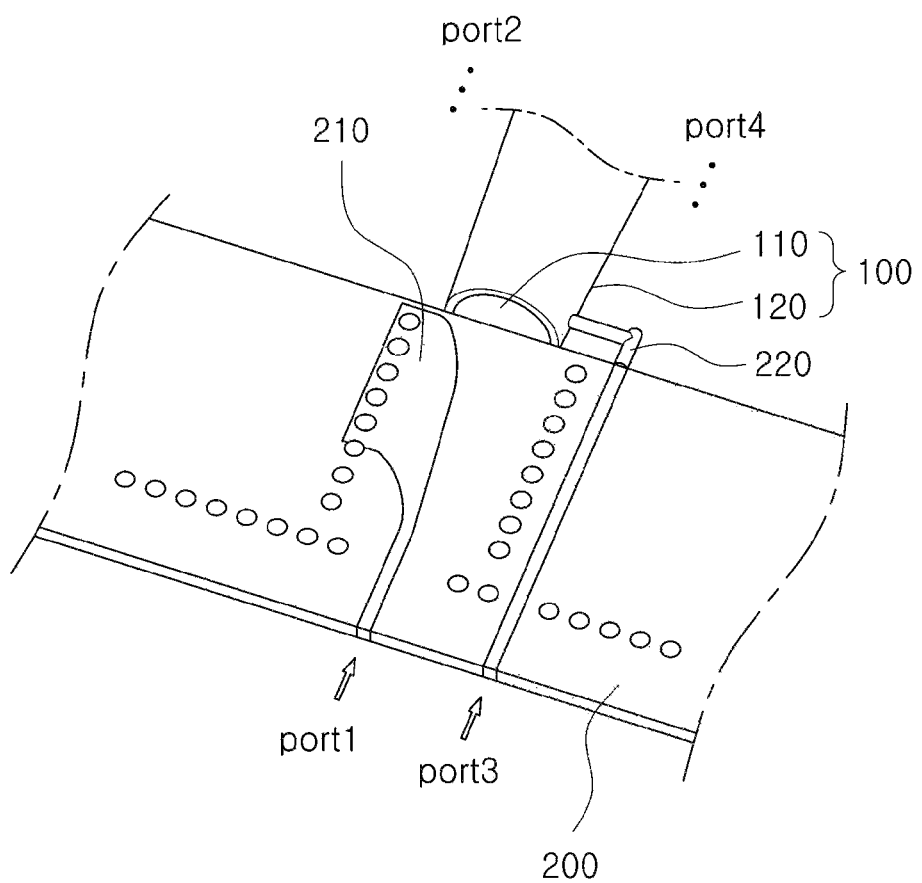
FIG. 3 illustratively shows the configuration in which a microstrip circuit and a waveguide are coupled according to one embodiment of the invention.

According to one embodiment of the invention, a signal generated from the first chip may be propagated by a feeding line (210 in FIG. 3) or a probe included in the first microstrip circuit 200a, and may be transmitted to the second chip through the waveguide 100 as the signal is transited at an impedance discontinuity surface between the first microstrip circuit 200a and the waveguide 100 or delivered through a physical connection line (220 in FIG. 3).

Further, according to one embodiment of the invention, a signal transmitted through the waveguide 100 may be transmitted to the second chip through the second microstrip circuit 200b as the signal is transited at an impedance discontinuity surface between the waveguide 100 and the second microstrip circuit 200b or delivered through a physical connection line.

Configuration of the Waveguide

Hereinafter, the internal configuration of the waveguide 100 crucial for implementing the present invention and the functions of the respective components thereof will be discussed.

Figure 2A:
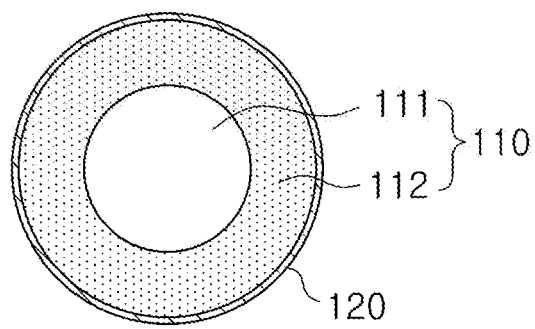
FIG. 2A illustratively shows the configuration of a waveguide according to one embodiment of the invention.
Figure 2B:
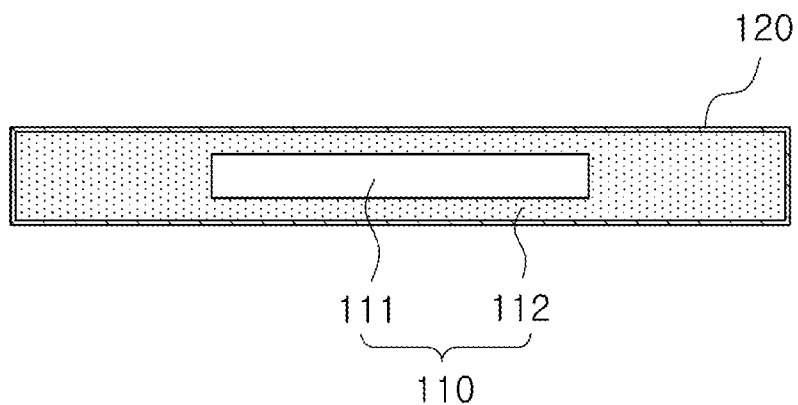
FIG. 2B illustratively shows the configuration of a waveguide according to one embodiment of the invention.

FIGS. 2A and 2B illustratively show the configuration of a waveguide according to one embodiment of the invention.

Referring to FIGS. 2A and 2B, the waveguide 100 according to one embodiment of the invention may comprise a dielectric part 110 and a conductor part 120 surrounding at least a part of the dielectric part 110. Further, according to one embodiment of the invention, a signal of a first frequency band may be transmitted through the dielectric part 110, and a signal of a second frequency band lower than the first frequency band or a direct current (DC) signal may be transmitted through the conductor part 120.

Specifically, according to one embodiment of the invention, the dielectric part 110 may comprise two or more dielectrics having different permittivity. For example, the dielectric part 110 according to one embodiment of the invention may comprise a first dielectric 111 and a second dielectric 112 having different permittivity.

More specifically, according to one embodiment of the invention, the second dielectric 112 may be formed to surround at least a part of the first dielectric 111. That is, the second dielectric 112 may surround all or a part of the first dielectric 111. For example, the first dielectric 111 may be in the form or a circular core, and the second dielectric 112 and the conductor part 120 may be in the form of an annular cladding, as seen from a cross-section cut along a direction perpendicular to the length of the waveguide 100, as shown in FIG. 2A. As another example, the first dielectric 111 may be in the form or a rectangular core, while the second dielectric 112 may be in the form of a rectangular cladding surrounding at least a part of the first dielectric 111, and the conductor part 120 may be in the form of a rectangular cladding surrounding at least a part of the second dielectric 112, as seen from a cross-section cut along a direction perpendicular to the length of the waveguide 100, as shown in FIG. 2B.

Meanwhile, in the embodiments of FIGS. 2A and 2B, according to one embodiment of the invention, the central axes of the first dielectric 111, the second dielectric 112, and the conductor part 120 may coincide with each other.

Meanwhile, according to one embodiment of the invention, the conductor part 120 may consist of a material having electrical conductivity. For example, the conductor part 120 according to one embodiment of the invention may consist of a metallic material such as copper (Cu) which is traditionally in wide use, or may consist of a non-metallic material such as graphene.

However, it is noted that the internal configuration or shape of the waveguide 100 according to the invention is not necessarily limited to those mentioned above, and may be changed without limitation as long as the objects of the invention can be achieved.

Meanwhile, according to one embodiment of the invention, the permittivity of the first dielectric 111 may be greater or less than that of the second dielectric 112. More specifically, according to one embodiment of the invention, the first dielectric 111 and the second dielectric 112 having different permittivity may be used to drastically reduce the degree of change in a group delay occurring according to a frequency change in a signal transmission channel via the waveguide 100.

For example, the first dielectric 111 may consist of Teflon™ having a dielectric constant of about 2.0, and the second dielectric 112 may consist of polyethylene having a dielectric constant of about 1.2. Further, as another example, the first dielectric 111 may consist of air having a dielectric constant of about 1.0, and the second dielectric 112 may consist of Teflon™ having a dielectric constant of about 2.0. Conversely, the first dielectric 111 may consist of Teflon™ and the second dielectric 112 may consist of air.

Therefore, according to one embodiment of the invention, a signal transmitted through the dielectric part 110 (i.e., an electromagnetic wave) may be guided along a boundary between the first dielectric 111 and the second dielectric 112 having different permittivity, or along a boundary between the second dielectric 112 and the conductor part 120.

Although not shown in the drawings, according to one embodiment of the invention, two or more waveguides 100 (i.e., the two or more waveguides 100 each comprising the first dielectric 111, the second dielectric 112, and the conductor part 120) may be coupled in a predetermined arrangement to form a bundle, and the two or more waveguides 100 included in the bundle may function to transmit signals through different signal transmission channels, respectively.

Although it has been mainly described above that the dielectric part 110 included in the waveguide according to the invention is composed of two dielectrics having different permittivity (i.e., the first dielectric 111 and the second dielectric 112), it is noted that the configuration of the dielectric part of the waveguide according to the invention is not necessarily limited to the above description, and may be changed without limitation as long as the objects or effects of the invention can be achieved. For example, the dielectric part of the waveguide according to another embodiment of the invention may comprise three or more dielectrics having different permittivity.

Although details or parameters for the components included in the waveguide according to one embodiment of the invention have been described above in detail, it is noted that the configuration of the microstrip circuit according to the invention is not necessarily limited to those mentioned above, and may be changed without limitation as long as the objects or effects of the invention can be achieved.

Meanwhile, as briefly mentioned above, according to one embodiment of the invention, the frequency of the signal transmitted through the dielectric part 110 may differ from that of the signal transmitted through the conductor part 120. Specifically, according to one embodiment of the invention, a signal of a first frequency band may be transmitted through the dielectric part 110, and a signal of a second frequency band lower than the first frequency band or a DC signal may be transmitted through the conductor part 120. Further, according to one embodiment of the invention, power transmission may be carried out through the conductor part 120. Here, according to one embodiment of the invention, the conductor part 120 corresponds to a conductor-based interconnect (e.g., copper wire) which is commonly in wide use, and may serve as a transmission medium still having excellent performance in transmitting a signal of a frequency band that does not suffer from skin effect caused by electromagnetic induction (i.e., a signal of a relatively lower frequency band or a DC signal).

Meanwhile, according to another embodiment of the invention, the waveguide may comprise two or more conductor parts that transmit signals of different frequency bands. For example, the waveguide according to another embodiment of the invention may comprise a first conductor part and a second conductor part through which a first-second frequency band signal and a second-second frequency band signal having different frequency bands are transmitted, respectively. Here, the first-second frequency band and the second-second frequency band may be lower than the first frequency band, which is the frequency band of the signal transmitted through the dielectric part.

FIG. 3 illustratively shows the configuration in which a microstrip circuit and a waveguide are coupled according to one embodiment of the invention.

Referring to FIG. 3, a first signal transmission channel corresponding to a transition occurring in an impedance discontinuity surface between the microstrip circuit 200 and the waveguide 100 may be specified, and a second signal transmission channel corresponding to a line physically connecting the microstrip circuit 200 and the conductor part 120 of the waveguide 100 may be specified. According to one embodiment of the invention, a signal of a first frequency band may be transmitted through the first signal transmission channel, and a signal of a second frequency band lower than the first frequency band or a DC signal may be transmitted through the second signal transmission channel.

In the embodiment of FIG. 3, input and output ports of the first signal transmission channel will be referred to as port 1 (port 1 in FIG. 3) and port 2 (port 2 in FIG. 3), respectively, while input and output ports of the second signal transmission channel will be referred to as port 3 (port 3 in FIG. 3) and port 4 (port 4 in FIG. 3), respectively.

Meanwhile, although it is described in the embodiment of FIG. 3 that the microstrip circuit and the waveguide are coupled parallel to each other, the coupling structure according to the invention is not necessarily limited thereto. It is noted that the microstrip circuit and the waveguide may be coupled perpendicularly to each other or in other directions as long as the objects of the invention can be achieved.

Figure 4A:
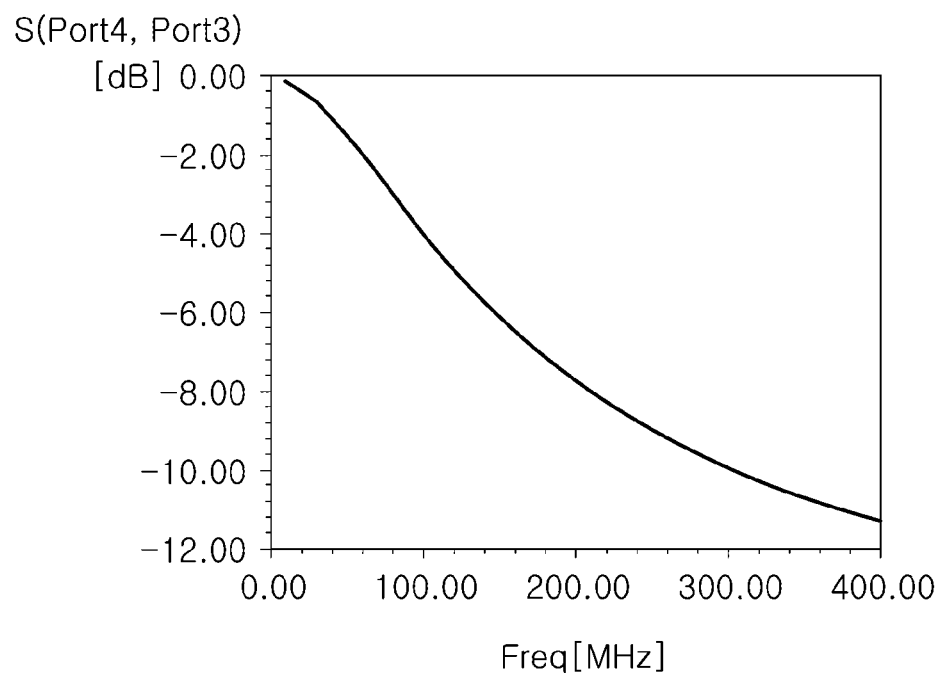
FIG. 4A illustratively shows frequency characteristics of signal transmission channels between a microstrip circuit and a waveguide according to one embodiment of the invention.
Figure 4B:
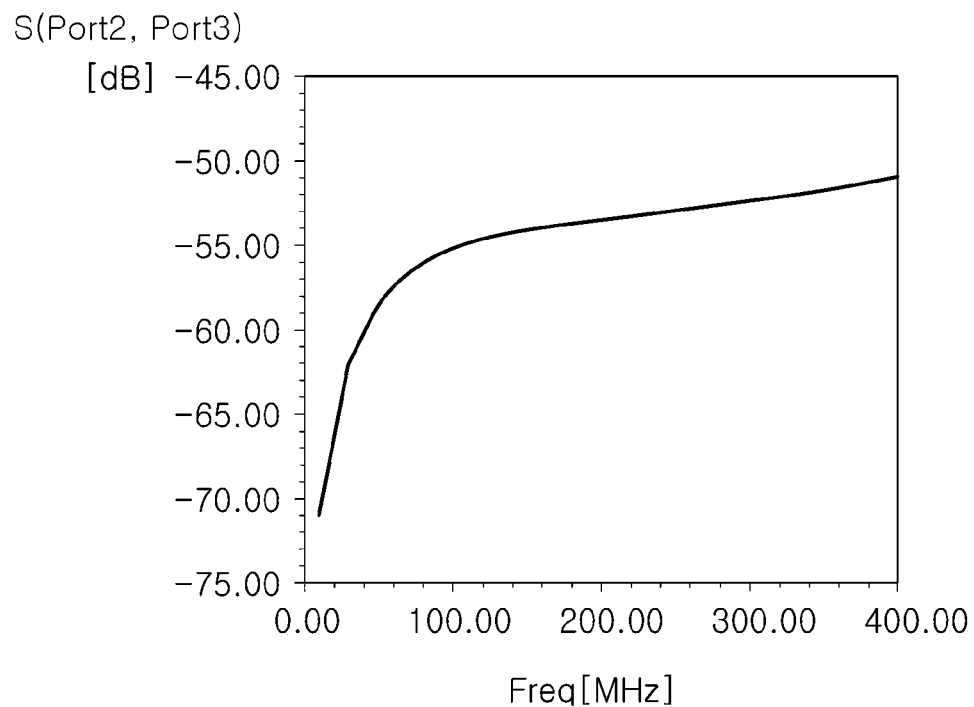
FIG. 4B illustratively shows frequency characteristics of signal transmission channels between a microstrip circuit and a waveguide according to one embodiment of the invention.

FIGS. 4A and 4B illustratively show frequency characteristics of signal transmission channels between a microstrip circuit and a waveguide according to one embodiment of the invention.

First, referring to FIG. 4A, in the second signal transmission channel via the conductor part 112, a forward transmission coefficient of a signal (i.e., S (Port 4, Port 3) in the embodiment of FIG. 3) is high in a relatively lower frequency band (see the graph of FIG. 4A where S (Port 4, Port 3) is shown in dB and the frequency is shown in MHz). Thus, it can be seen that the signal loss is small and the signal transmission performance is sufficiently excellent in a relatively lower frequency band.

Next, referring to FIG. 4B, between the input port (i.e., port 3) of the second signal transmission channel via the conductor part 120 and the output port (i.e., port 2) of the first signal transmission channel via the dielectric part 110, a forward transmission coefficient of a signal (i.e., S (Port 2, Port 3) in the embodiment of FIG. 3) is as small as −50 dB or less over all frequency bands (see the graph of FIG. 4B where S (Port 2, Port 3) is shown in dB and the frequency is shown in MHz). In particular, the forward transmission coefficient is much smaller in a relatively lower frequency band. Thus, it can be seen that a signal transmitted through the second signal transmission channel via the conductor part 120 (i.e., a signal of a relatively lower frequency band or a DC signal) has very small influence on a signal transmitted through the first signal transmission channel via the dielectric part 110 (i.e., a signal of a relatively higher frequency band).

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:
1. A chip-to-chip interface apparatus, comprising:
a waveguide for transmission of electromagnetic wave signals; and
a microstrip circuit coupled to the waveguide,
wherein the waveguide comprises a dielectric part and a conductor part surrounding at least a part of the dielectric part,
wherein a signal of a first frequency band is transmitted through the dielectric part, and a signal of a second frequency band lower than the first frequency band is transmitted through the conductor part, wherein the microstrip circuit transmits the signal of the first frequency band to be transmitted through the dielectric part and the signal of the second frequency band to be transmitted through the conductor part to the dielectric part and the conductor part, respectively, and wherein the signal of the first frequency band is transmitted through a transition occurring in an impedance discontinuity surface between the waveguide and the microstrip circuit, and the signal of the second frequency band is transmitted through a physical connection line between the waveguide and the microstrip circuit.

2. The waveguide of claim 1, wherein a direct current (DC) signal is transmitted through the conductor part.

3. The waveguide of claim 1, wherein the dielectric part comprises two or more dielectrics having different permittivity.

4. The waveguide of claim 3, wherein the two or more dielectrics comprise a first dielectric and a second dielectric, and the second dielectric surrounds at least a part of the first dielectric.

5. The waveguide of claim 1, wherein a signal transmitted through the dielectric part is guided along a boundary between the dielectric part and the conductor part.

6. The waveguide of claim 1, wherein interference between a signal transmission channel of the signal transmitted through the dielectric part and a signal transmission channel of the signal transmitted through the conductor part does not exceed a predetermined level.

7. The waveguide of claim 1, wherein the conductor part comprises two or more conductor parts through which signals of two or more different frequency bands falling within the second frequency band are respectively transmitted.

* * * * *